United States Patent [19]

Schwiers et al.

[11] 4,311,558
[45] Jan. 19, 1982

[54] PRESSURE VESSEL FOR A NUCLEAR POWER PLANT

[75] Inventors: Hans-Georg Schwiers, Ketsch; Josef Schoening, Hambruecken, both of Fed. Rep. of Germany

[73] Assignee: Hochtemperatur-Reaktorbau GmbH, Cologne, Fed. Rep. of Germany

[21] Appl. No.: 121,576

[22] Filed: Feb. 14, 1980

[30] Foreign Application Priority Data

Mar. 7, 1979 [DE] Fed. Rep. of Germany ....... 2908968

[51] Int. Cl.³ .............................................. G21C 19/28
[52] U.S. Cl. ...................................... 376/296; 52/505
[58] Field of Search ................ 176/60, 65, 87; 52/505

[56] References Cited

U.S. PATENT DOCUMENTS

| | | | |
|---|---|---|---|
| 4,050,984 | 9/1977 | Arndt | 176/60 |
| 4,158,604 | 6/1979 | Cook | 176/60 |
| 4,175,001 | 11/1979 | Haferkamp | 176/60 |
| 4,183,784 | 1/1980 | Haferkamp | 176/60 |

*Primary Examiner*—Donald P. Walsh
*Attorney, Agent, or Firm*—Schwartz, Jeffery, Schwaab, Mack, Blumenthal & Koch

[57] ABSTRACT

Disclosed is a pressure vessel of a nuclear power plant comprising a generally cylindrical shaped first partial section, a cavity for housing a high temperature reactor within the first partial section, a second partial section forming the lower part of the pressure vessel, a horizontal tunnel for housing a gas turbine assembly within the second partial section and a plurality of recesses for housing components of a heat exchanger apparatus, wherein the cavity for housing the high temperature reactor is eccentrically arranged in the first partial section of the pressure vessel with respect to the cylindrical shape.

12 Claims, 4 Drawing Figures

PRESSURE VESSEL FOR A NUCLEAR POWER PLANT

BACKGROUND OF THE INVENTION

1. Field of the Invention

The invention relates to a pressure vessel for a nuclear power plant. More particularly, the invention concerns pressure vessels of reinforced concrete of special design to house the various components of a nuclear power plant such as a gas cooled high temperature reactor, gas turbine assembly and heat exchange apparatus. The pressure vessel is generally of a cylindrical configuration at least over a substantial partial area. A cavity for the high temperature reactor and a horizontally extending tunnel for the gas turbine assembly are provided in the pressure vessel. Similarly, a plurality of recesses or cavities for the components of the heat exchanger apparatus extending in the longitudinal direction through the reinforced concrete pressure vessel are also provided.

2. Background of the Prior Art

It is known that any nuclear reactor, regardless of its type must be surrounded by a container impermeable to harmful radiation for the purpose of shielding the outside against the radiation produced by nuclear fission in the core of the reactor. Furthermore, reactors operating in an overpressurized state, i.e. reactors wherein cooling is effected by means of an overpressurized cooling medium (mostly in the gaseous state) must be included in a completely impermeable and pressure resistant sheathing. This sheathing is the so-called pressure vessel. It is well known in the art to combine the radiation shield and the pressure vessel into a single tight and pressure resistant containment, performing both the functions of biological protection against radiation and the complete sealing of the nuclear reactor. This shield also acts to safely contain the internal overpressure. The known pressure vessel is made of concrete, wherein essentially inwardly directed prestresses are created in order to increase the compressive strength and impermeability by means of prestressing elements. The prestresses are greater than the stresses generated by the overpressure of the cooling medium within the reactor.

In the so called integrated nuclear reactor installations, in addition to the nuclear reactor, the heat exchanger apparatus comprising steam generators and after-heat removal systems are also arranged within the reinforced concrete pressure vessel. They may be housed in a common cavity together with the nuclear reactor. One example of a known design of this type is the THTR-300 MWe power station.

In a preferred prior art design, the nuclear reactor is installed in a cavity located in the center area of the pressure vessel and the heat exchanger components are housed in recesses, so called pods, extending in the longitudinal direction through the walls of the pressure vessel. The pods are arranged in a circular manner around the cavity of the reactor. Reinforced concrete pressure vessels of this type are described in West German Offenlegungsschrift Nos. 15 39 887 and 16 84 651.

Another known type of reinforced concrete pressure vessel for nuclear power plants houses a gas cooled high temperature reactor and one or more heat utility circuits comprising a gas turbine assembly and various heat exchanger devices. The heat exchanger devices such as recuperators, precoolers and possibly intermediate coolers are arranged in the above-described recesses or pods, while the gas turbine assembly is installed in a horizontal tunnel underneath the core of the reactor. West German Offenlegungsschrift No. 25 18 357 represents a reinforced concrete pressure vessel of this type.

In all of the above-described reinforced concrete pressure vessels the cavity for the nuclear reactor is a configuration adapted to the nuclear reactor (i.e. it has a circular cross section) and is arranged centrally in the pressure vessel. The reactor cavity diameter, together with the diameters of the recesses or pods determines the dimensions of the reinforced concrete pressure vessel. However, the width of the concrete web that must be provided between the cavity and the recesses and between the recesses and the external jacket of the pressure vessel, also plays a significant role. The dimensions of the reinforced concrete pressure vessel is thus decisively determined by the arrangement of the cavities in the pressure vessel with respect to each other. In the case of integrated nuclear power installations, the construction of the pressure vessel itself represents a very expensive structural section and requires an extended construction time. It is, therefore, desirable to design a compact structural configuration of a nuclear power plant with a favorable distribution of the individual cavities within the volume of the pressure vessel.

SUMMARY OF THE INVENTION

Based on the state of the art as described hereinabove, it is the object of the present invention to provide a pressure vessel of the above-described type with improvement in the design so that its dimensions are substantially reduced and its prestressing system is utilized in an optimum manner.

According to the invention, this object is attained by arranging the cavity for the high temperature reactor in an off-center location within the pressure vessel. The reactor cavity is also located over the partial area of the pressure vessel containing a horizontal tunnel for a gas turbine assembly.

Advantageously, the pressure vessel is preferably a reinforced concrete pressure vessel.

By means of the eccentrical location of the reactor cavity, an optimum arrangement of the remaining nuclear power plant components integrated in the pressure vessel may be effected. Such an arrangement has a direct effect on the external dimensions of the reinforced concrete pressure vessel. The degree of the eccentricity of the reactor cavity is governed by the relationship of the components to be housed in the individual cavities with respect to each other.

It is a major advantage of the reinforced concrete pressure vessel that during its construction the individual vessel areas may be disconnected, i.e. it is possible to construct different sections of the pressure vessel simultaneously. The process of construction may thereby be scheduled in a flexible manner with delays in the progress of one section or another having a lesser effect on the length of the construction period.

The individual tasks in the establishment of the prestressing system may also be separated so that the stressing cables may be laid out and installed in an optimum manner. This makes it possible to obtain an equalized stress utilization of the load bearing cross sections of the vessel.

A particularly favorable arrangement of the recesses for the heat exchange apparatus may be obtained by shifting the cavity for the high temperature reactor in the direction of the longitudinal axis of a horizontal tunnel from the center of the reinforced concrete pressure vessel. The horizontal tunnel houses the gas turbine assembly. In this case, the improvements sought by the invention may be effected without interfering with the choice of the individual power plant components installed.

Advantageously, the recesses for the components of the heat exchange apparatus are arranged symmetrically on both sides of the horizontal tunnel for the gas turbine assembly. These recesses may also be placed in arrangement around the cavity for the high temperature reactor even though such cavity is eccentrically displaced. It is also possible, however, to arrange the recesses for the heat exchange apparatus and the cavity for the high temperature reactor in two separate but adjacent areas of the reinforced concrete pressure vessel. In a cylindrical pressure vessel, for example, the recesses are located in one half of the cylinder, while the reactor cavity is in the other half of the cylinder. In this case, the eccentricity of the reactor cavity is very great.

The reinforced concrete pressure vessel (i.e. with a strongly eccentric reactor cavity) described hereinabove may be built with high cost efficiency. It is offset transversely to the longitudinal axis of the horizontal tunnel in its area underneath the reactor cavity. The horizontal tunnel should be arranged so that it is located entirely in the remaining section of the pressure vessel. This section also contains the recesses for the components of the heat exchanger apparatus or device. These recesses traverse the pressure vessel at its greatest length according to this arrangement.

According to another advantageous preferred embodiment of the invention, the individual partial sections of the reinforced concrete pressure vessel are prestressed to a different degree, whereby the individual prestressing is adapted to the different requirements posed by the different components installed in the cavities. In this manner, prestresses may be obtained in the individual partial areas according to the optimized design for each component.

The arrangement of prestressed areas of varying degree may be applied with particular advantage to a reinforced concrete pressure vessel. To form the individual cavities, exposed to different pressures, the number of stressing cables and their placement may be adapted accurately to the prevailing requirements.

DETAILED DESCRIPTION OF THE PREFERRED EMBODIMENTS

In the drawings, two examples of the preferred embodiments of the reinforced concrete pressure vessel are represented schematically. The figures individually show the following:

Figure 3:
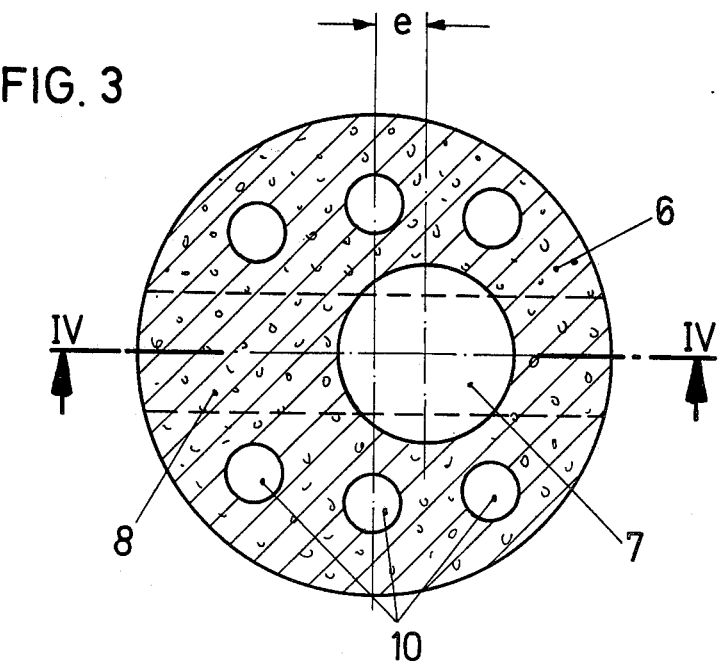
Figure 4:
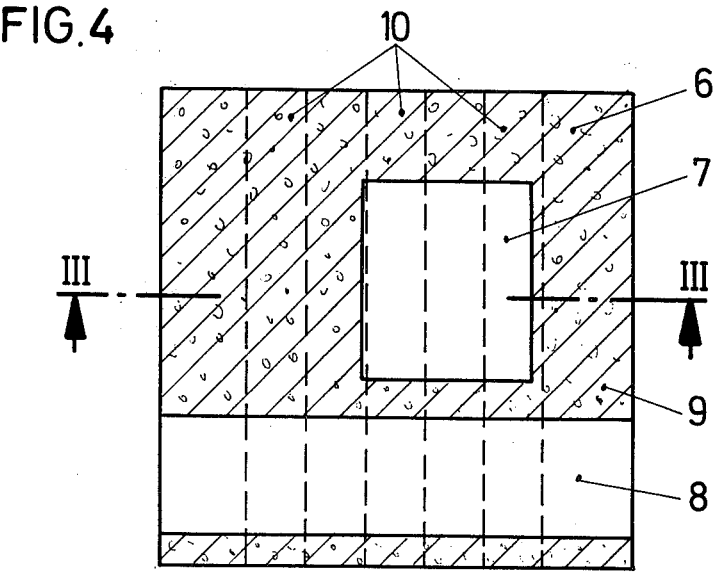

FIG. 3 discloses a top view cross section in a second example of a preferred embodiment along line III—III of FIG. 4, and FIG. 4 shows a side view cross section along line IV—IV of FIG. 3.

Figure 1:
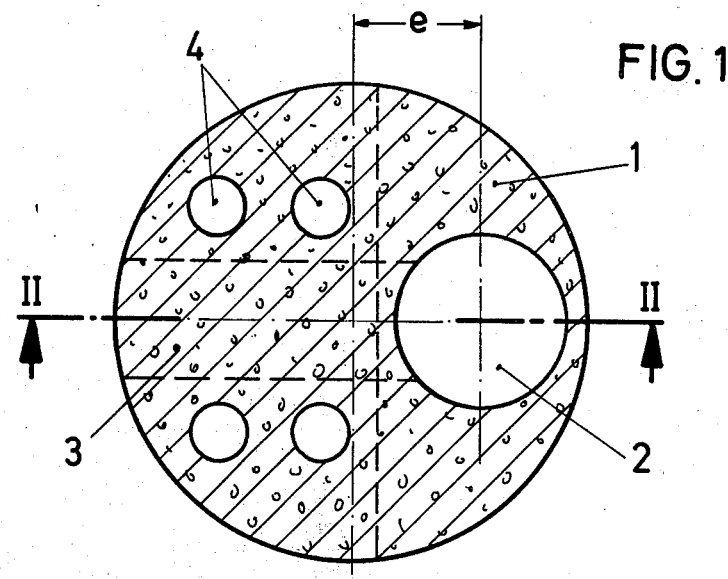
FIG. 1 shows a first example of a preferred embodiment in a top view cross section along the line I—I of FIG. 2.
Figure 2:
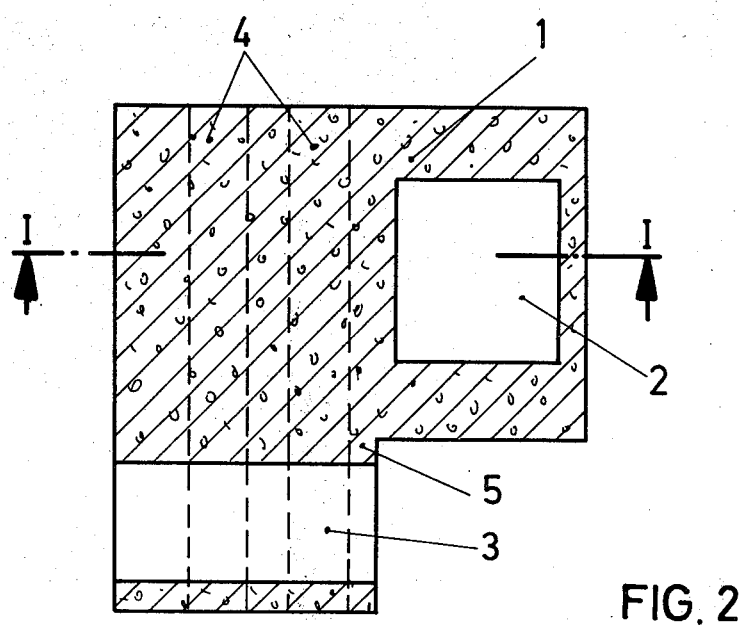
FIG. 2 depicts a side view cross section along line II—II of FIG. 1.

FIGS. 1 and 2 show a generally cylindrically shaped reinforced concrete pressure vessel 1 for a nuclear power plant. The pressure vessel actually houses, for example, a gas cooled high temperature reactor, a gas turbine assembly and a plurality of heat exchanger devices such as recuperators, precoolers and intermediate coolers. These individual components are housed within cavities in the reinforced concrete pressure vessel 1, that is, an integrated mode of construction is employed for the nuclear power plant and pressure vessel. The components are not shown in the drawings as they may be any high temperature reactor, gas turbine assembly, recuperator, precooler, intermediate cooler and the like. Examples of such devices are more completely disclosed in U.S. Pat. Nos. 4,045,285; 4,118,276 and 4,175,001, the disclosures of which are herein by reference.

The design of the cavities housing the individual components of the power plant comprise a cylindrical cavity 2 to house the high temperature reactor, a horizontal tunnel 3 to house the gas turbine assembly and four vertical recesses 4 to house the heat exchanger devices. The vertical recesses 4 are arranged on both sides of the horizontal tunnel 3 and symmetrically to said tunnel.

The cavity 2, located over the partial section 5 containing the horizontal tunnel 3, displays an eccentricity e, i.e. it is displaced in the direction of the longitudinal axis of the horizontal tunnel 3 from the center of the reinforced concrete pressure vessel 1. The location of this cavity is generally within one half of the cylindrical reinforced concrete pressure vessel 1. The other half of the pressure vessel contains all four of the vertical recesses 4.

From the side view as depicted in FIG. 2, the reinforced concrete pressure vessel 1 is offset in its area underneath the cavity 2 transversely to the longitudinal axis of the horizontal tunnel 3. The remaining section of the pressure vessel coincides with the partial section 5 of the pressure vessel, wherein the horizontal tunnel 3 is located. The horizontal tunnel 3 is located in its entirety within this section of the pressure vessel. The vertical recesses 4 for the heat exchanger apparatus are also extending through the section 5 of the pressure vessel.

In a second example of a preferred embodiment shown in FIGS. 3 and 4, the reinforced concrete pressure vessel 6 is of a more exact cylindrical configuration than the vessel of FIGS. 1 and 2. The similarly cylindrical cavity 7 which houses the high temperature reactor is here again in an eccentric position, but the eccentricity e is significantly less than in the first example shown in FIGS. 1 and 2. The horizontal tunnel 8 for the gas turbine assembly is again located in a lower partial section 9 of the reinforced concrete pressure vessel 6. This horizontal tunnel 8 extends directly underneath and along the cavity 7.

The nuclear power plant housed in the reinforced concrete pressure vessel 6 comprises a greater number of heat exchanger devices and therefore six vertical recesses 10 are provided to house the heat exchanger devices. The vertical recesses 10 extend in an arrangement symmetrical with respect to the horizontal tunnel 8 through the entire reinforced concrete pressure vessel. They are also arranged so that they generally surround the cavity 7 for the high temperature reactor.

In both of these examples of preferred embodiments, partial sections of the reinforced concrete pressure vessels 1 and 6, respectively, while exposed to different requirements, may be prestressed to different degrees. Such partial sections are, for example, the areas of the pressure vessel which contain the cavities for the components of the nuclear power plant. Depending on the components installed in the various cavities, the housing around such cavities can be reinforced or prestressed under different pressures and according to the requirements of particular design. Varying degrees of eccentricity of the cavity housing the high temperature reactor may be easily selected according to the flexibility of reinforcement requirements for the pressure vessel.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. A pressure vessel for a nuclear power plant comprising a generally cylindrical shaped first partial section, a cavity for housing a high temperature reactor within said first partial section, a second partial section forming the lower part of the pressure vessel, a horizontal tunnel for housing a gas turbine assembly within said second partial section and a plurality of recesses for housing components of a heat exchanger apparatus wherein said cavity for housing the high temperature reactor is eccentrically arranged with respect to said generally cylindrical shape in said first partial section of said pressure vessel.

2. The pressure vessel of claim 1 comprising a reinforced concrete pressure vessel.

3. The reinforced concrete pressure vessel of claim 2 wherein said recesses extend in the longitudinal direction throughout said pressure vessel.

4. The reinforced concrete pressure vessel of claim 2 wherein said cavity is arranged above said partial section housing said horizontal tunnel.

5. The reinforced concrete pressure vessel according to claim 2 wherein said cavity for housing the high temperature reactor is eccentrically displaced in the direction of said horizontal tunnel from the center of the reinforced concrete pressure vessel.

6. The reinforced concrete pressure vessel according to claim 2, wherein said recesses for housing components of the heat exchanger apparatus are arranged on both sides of said horizontal tunnel and symmetrically perpendicular with respect to said tunnel.

7. The reinforced concrete pressure vessel according to claim 6, wherein said recesses are arranged to generally surround said cavity for housing the high temperature reactor.

8. The reinforced concrete pressure vessel according to claim 6, wherein said recesses and said cavity for housing the high temperature reactor are located in two adjacent areas of the reinforced concrete pressure vessel.

9. The reinforced concrete pressure vessel according to claim 8, wherein said reinforced concrete pressure vessel, in its area located underneath said cavity for housing the high temperature reactor, is offset transversely to the longitudinal axis of said horizontal tunnel.

10. The reinforced concrete pressure vessel according to claim 9, wherein said horizontal tunnel is located entirely within said second partial section of the pressure vessel and said recesses for housing the components of the heat exchanger apparatus extend vertically within said first and second partial sections of the pressure vessel.

11. The reinforced concrete pressure vessel according to claim 2, wherein said first and second partial sections of the reinforced concrete pressure vessel are prestressed to different degrees.

12. The reinforced concrete pressure vessel according to claim 11, wherein said prestressing in said first and second partial sections of the reinforced concrete pressure vessel is adapted to the pressures prevailing in said cavity, tunnel and recesses.

* * * * *